United States Patent [19]

Lo

[11] Patent Number: 4,872,643

[45] Date of Patent: Oct. 10, 1989

[54] VALVE

[75] Inventor: Yi C. Lo, 8 Fl., No. 312, Sec. 4, Chung Hsiao E. Rd., Taipei, Taiwan

[73] Assignees: Robert C. Lin; Yi C. Lo, both of Taipei, Taiwan

[21] Appl. No.: 324,899

[22] Filed: Mar. 17, 1989

[51] Int. Cl.[4] ........................................... F16K 31/528
[52] U.S. Cl. ................................... 251/252; 251/118; 251/340; 251/900
[58] Field of Search ............... 251/118, 252, 340, 341, 251/347, 900

[56]  References Cited

U.S. PATENT DOCUMENTS

| | | | |
|---|---|---|---|
| 674,971 | 5/1901 | Kimman | 251/340 X |
| 721,665 | 3/1903 | Busha | 251/340 X |
| 841,322 | 1/1907 | Hoxie | 251/252 X |
| 954,320 | 4/1910 | Megget | 251/340 X |
| 1,269,213 | 6/1918 | Power | 251/252 X |
| 1,356,580 | 10/1920 | Witman | 251/252 X |
| 1,721,518 | 7/1929 | Larzelere | 251/340 X |
| 2,245,097 | 6/1941 | Tobler | 251/340 X |
| 2,955,798 | 10/1960 | Sights | 251/340 X |
| 3,367,626 | 2/1968 | Stern | 251/340 |
| 3,920,042 | 11/1975 | Blatt | 251/340 X |

FOREIGN PATENT DOCUMENTS

| | | | |
|---|---|---|---|
| 468270 | 9/1950 | Canada | 251/252 |
| 2115543 | 10/1971 | Fed. Rep. of Germany | 251/340 |

*Primary Examiner*—John Rivell
*Attorney, Agent, or Firm*—Bernard R. Gans

[57]  ABSTRACT

A valve including a primary tube, a secondary tube, a piston-like element, a pin, and a rotatable control ferrule. Two reduced diameter portions are formed on one end of the primary tube, in which the outer portion with a threaded outer surface has a smaller diameter, and the intermediate portion has a larger diameter. Two slots are formed on the opposite sides of the intermediate portion. The secondary tube has a threaded bore for making a threaded connection with the outer portion of the primary tube. The piston-like element is composed of a head and a rod with a transverse hole near its free end. The pin is slidably located in the hole of the rod. A control ferrule is rotatably disposed between the primary and the secondary tubes on the outer periphery surface. Two guide slots are formed in the annular inner surface of the control ferrule for receiving and guiding both ends of the pin in order to control the vertical movement of the piston-like element.

12 Claims, 4 Drawing Sheets

VALVE

BACKGROUND OF THE INVENTION

The present invention relates to a valve. The valve particularly described and illustrated herein is intended for use in mop or garden tubing, but is not limited to these applications.

Conventional mop or garden tubing has no control valve, therefore people have to turn on and off a tap which is located at the remote end of a hose in order to control the flow of water. This is very inconvenient.

The present invention has arisen to mitigate and/or obviate the afore-described disadvantages of conventional mop or garden tubing structure.

SUMMARY OF THE INVENTION

It is a primary object of the present invention to provide a valve, which can be operated easily.

The valve of the present invention includes a primary tube, and a secondary tube with one end threadedly connected with the primary tube. A piston-like element has a head portion slidably located in the secondary tube and a rod portion slidably located in the primary tube. A transverse hole is formed on the rod. A pin is slidably disposed in the hole of the rod. A rotatable control ferrule is rotatably disposed on the outer periphery surface between the two tubes, in which a helical guide slot is formed in the inner surface of the rotatable control ferrule for receiving and guiding the pin in order to control the up and down motion of the piston element, thereby controlling water flow through the valve.

DETAILED DESCRIPTION OF THE PREFERRED EMBODIMENT

Figure 1:
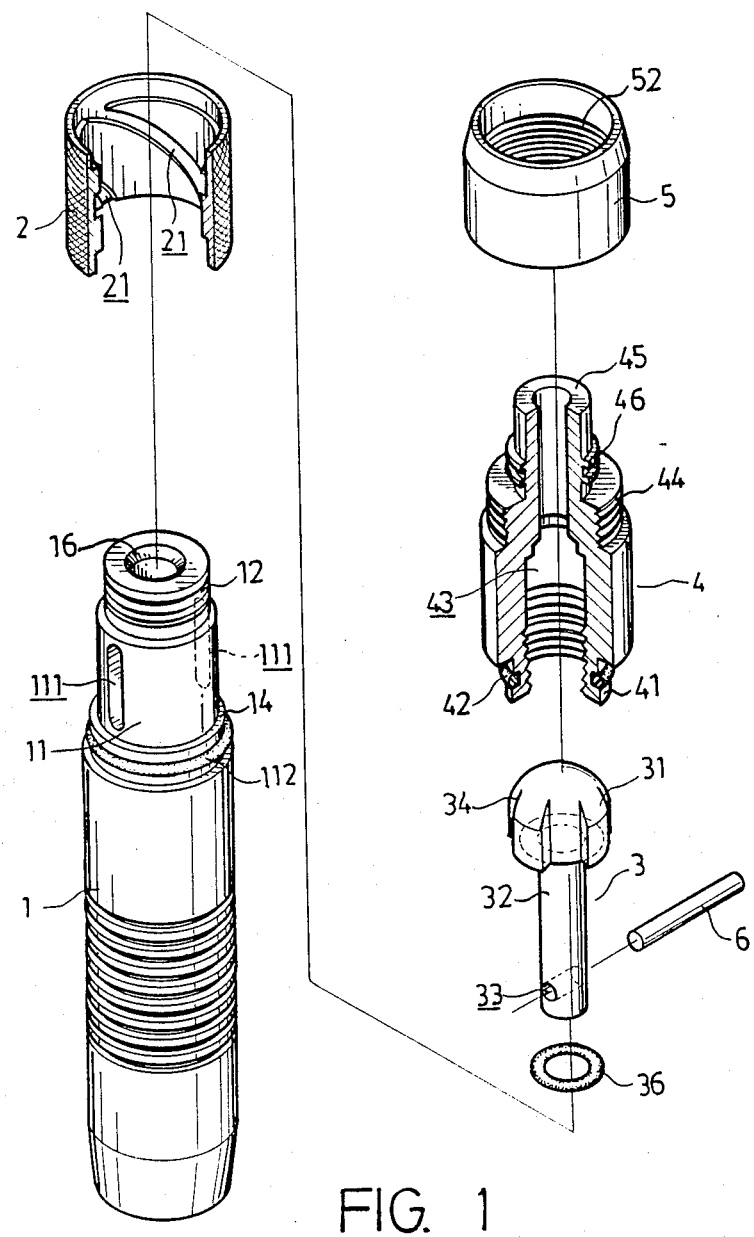
FIG. 1 is an exploded view of a valve in accordance with the present invention.

Referring to the drawings, the illustrated valve includes a primary tube 1 and a secondary tube 4 which have a threaded engagement therebetween and which are located about a common axis.

The primary tube 1 has two reduced diameter portions 11 and 12 formed on one end thereof, in which the first reduced diameter portion 11 with larger diameter is formed between the primary tube 1 and the second reduced diameter portion 12 with smaller diameter. The second reduced diameter portion 12 has a threaded outer wall. Two slots 111 are formed on the opposite sides of the first reduced diameter portion 11 in the direction parallel to the axis of the tubes 1, 11 and 12. An annular flange 14 with a diameter slightly larger than that of the first reduced diameter portion 11 is formed on the abutment of the first reduced diameter portion 11. The annular flange 14 has an intermediate annular groove for receiving an O-section sealing ring 112. The outer free end of the second reduced diameter portion 12 has a tapered annular inner surface 16.

The secondary tube 4 and the first reduced diameter portion 11 of the primary tube 1 are substantially equal in outer diameter. A lower flange 41 has an outer diameter substantially equal to that of the annular flange 14. An O-section sealing ring 42 is fitted within an intermediate annular groove formed in the outer wall of the lower flange 41. The secondary tube 4 has a threaded bore 43. A first cylinder 44 with a diameter slightly smaller than that of the secondary tube 4 is formed on one end of the secondary tube 4, and has a threaded outer wall. A second cylinder 45 is provided on the outer end of the first cylinder 44. The outer diameter, which corresponds to that of a hose 7, of the second cylinder 45 is smaller than that of the first cylinder 44. Several annular ribs 46 are formed on the outer surface of the second cylinder 45 for making a force-fitted airtight engagement with the hose 7, as mentioned above. A tapered surface (not shown) could be formed on the outer end of the second cylinder 45 for facilitating the insertion of the hose 7.

A piston-like element 3 is slidably fitted in threaded bore 43. The piston-like element 3 has a head 31 and a rod 32 with a transverse hole 33 near the free end of the rod 32 in a lateral direction intersecting the longitudinal axis of the rod 32. A pin 6 is insertable in the hole 33. The head 31 of the piston-like element 3 has a smooth end surface, for reducing the drag coefficient of the piston-like element 3. Several notches 34 are formed on the outer peripheral surface of the head 31 for allowing fluid to pass around the piston-like element 3. An O-section sealing ring 36 is fitted on the rod 32 at an abutment position where the head 31 and the rod 32 meet. An annular groove (not shown) could be provided for further stabilizing the fitting of the O-section sealing ring 36.

The rotatable control ferrule 2 is generally cylindrical with a knurled outer surface. Two guide slots 21 are formed on the opposite sides of the inner surface of the control ferrule 2 for receiving and guiding both ends of the pin 6, the curves of the guide slots 21 are helical and symmetrical. The rotatable control ferrule 2 is rotatably disposed between the primary tube 1 and the secondary tube 4, and makes an airtight engagement on both ends with the O-section sealing rings 112 and 42 respectively. The pin 6 is limited to vertical movement only by the slots 111, and is actuated by the rotation of the control ferrule 2 with the guide slot 21. A cylindrical collar 5 which has a threaded inner surface 52 threadably engages with the first cylinder 44 of the secondary tube 4. The annular compartment between the second cylinder 45 and the collar 5 receives the free end of the hose 7. The ribs 46 which are located in the annular compartment are provided for making an airtight frictional engagement between the second cylinder 45 slightly expandable materials, such as rubber, so that the free end of the hose 7 can be pressed into position.

The O-section sealing rings 36, 42 and 112 may, for example, be made of teflon (polytetrafluoroethylene).

The head 31 of piston-like element 3 slides freely in the bore 43 of the secondary tube 4, and the rod 32 of piston-like element 3 slides freely in the bore of the first reduced diameter portion 11 of the primary tube 1.

Figure 2:
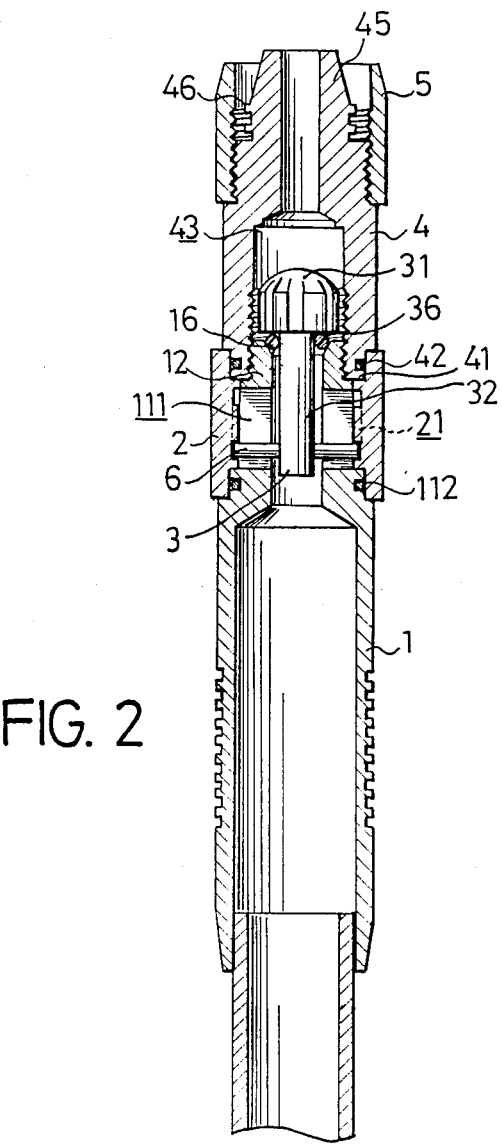
FIG. 2 is a longitudinal cross-sectional view of the valve of FIG. 1, in closed condition.
Figure 3:
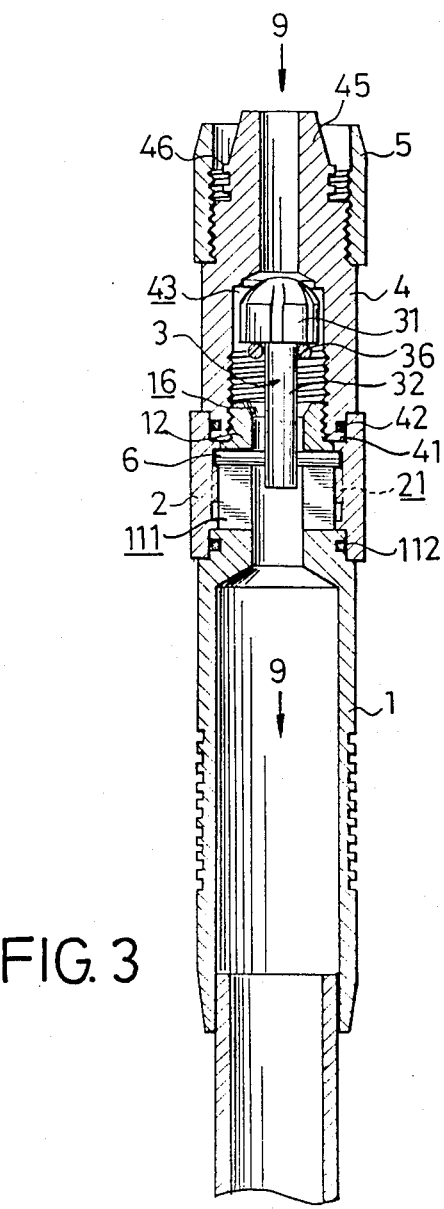
FIG. 3 is a longitudinal cross-sectional view similar to FIG. 2, but in open condition.
Figure 4:
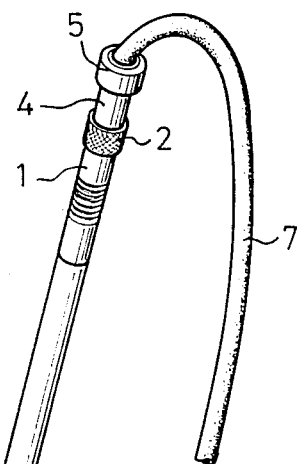
FIG. 4 is a perspective working view of a mop showing the application of the valve of FIG. 1.
Figure 4:
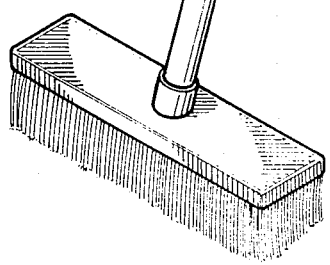

FIGS. 2 and 3 are longitudinal cross-sectional view of the valve in accordance with the present invention, in which FIG. 2 is in closed condition and FIG. 3 is in open condition.

Referring to FIG. 2, each end of the pin 6 fits in a respective guide slot 21 so that the pin is in the lower position. At this time, the O-section sealing ring 36 bears against the tapered surface 16, and is compressed to make an airtight engagement between the head 31 of the piston 3 and the second reduced diameter portion 12 of the primary tube 1 so as to prevent passage of fluid therethrough.

When rotating the rotatable control ferrule 2 clockwise, depending on the direction of the curves of the guide slots 21, the pin 6 moves up in slot 111 with respect to the vertical position of guide slot 21 at slot 111.

Referring to FIG. 3, the pin 6 is in the upper position. The head 31 of the piston-like element 3 is separated from the second reduced diameter portion 12 of the primary tube 1. Thus, a passage of fluid is constituted in tubes 1 and 4. Fluid supplied from the hose 7 flows through the center holes of tubes 1 and 4 and bypasses the piston-like element 3, as shown in the direction indicated by arrows 9. Therefore, the valve according to the present invention can be operated easily, and requires comparatively little mechanical force.

While the present invention has been explained in relation to its preferred embodiments, it is to be understood that various modifications or alterations thereof will become apparent to those skilled in the art upon reading this specification. Therefore it is to be noted that all such modifications or alterations should be considered as falling within the scope of the appended claims.

I claim:

1. A valve, comprising:
   a primary tube having two successive reduced diameter portions formed on one end thereof, a first reduced diameter portion having a larger diameter being formed on one end of the primary tube and a second reduced diameter portion with a smaller diameter being formed on an outer free end of the first reduced diameter portion, two slots being formed on the opposite sides of the first reduced diameter portion, and a first sealing ring being fitted at an abutment of the primary tube and the first reduced diameter portion;
   a secondary tube, one end of the second reduced diameter portion being connected to said secondary tube, said secondary tube having a reduced diameter annular flange formed on one end thereof, and a sealing ring being fitted on an outer surface of the flange;
   a piston-like element having a head portion being slidable in a bore of the secondary tube, and a rod portion being slidable in a bore of the primary tube, a transverse hole being formed on the rod portion, and a second sealing ring being fitted at an abutment of the head portion and the rod portion;
   a pin being slidable in the transverse hole; and
   a rotatable control ferrule being rotatably disposed between the primary tube and the secondary tube, two guide slots being formed on the opposite sides of an inner surface of the control ferrule for receiving and guiding opposite ends of the pin.

2. A valve according to claim 1, wherein an annular flange is formed between the first reduced diameter portion and the primary tube.

3. A valve according to claim 2, wherein an intermediate annular groove is formed on the outer surface of the annular flange.

4. A valve according to claim 1, wherein a conical inner surface is formed at an outer free end of the second reduced diameter portion of the primary tube.

5. A valve according to claim 1, wherein a cylinder with smaller diameter is formed on a free end of the secondary tube.

6. A valve according to claim 5, wherein a plurality of annular ribs are formed on an outer wall of the cylinder.

7. A valve according to claim 1, wherein the head portion of the piston-like element has a smooth end surface.

8. A valve according to claim 1, wherein a plurality of notches are formed on a peripheral surface of the head portion.

9. A valve according to claim 1, wherein the guide slots of the control ferrule are helical.

10. A valve according to claim 5, wherein a collar with a threaded inner surface is further provided to make a threaded engagement with an outer end of the secondary tube for constructing an annular accommodation between the cylinder and the collar.

11. A valve according to claim 1, wherein a threaded outer wall is formed on the second reduced diameter portion, and a threaded inner wall is formed on the bore for making a threaded engagement therebetween.

12. A valve according to claim 1, wherein the first and second sealing rings are O-section sealing rings.

* * * * *